(No Model.)
P. W. THOMSON.
CHECK ROW CORN PLANTER.
No. 264,794. Patented Sept. 19, 1882.
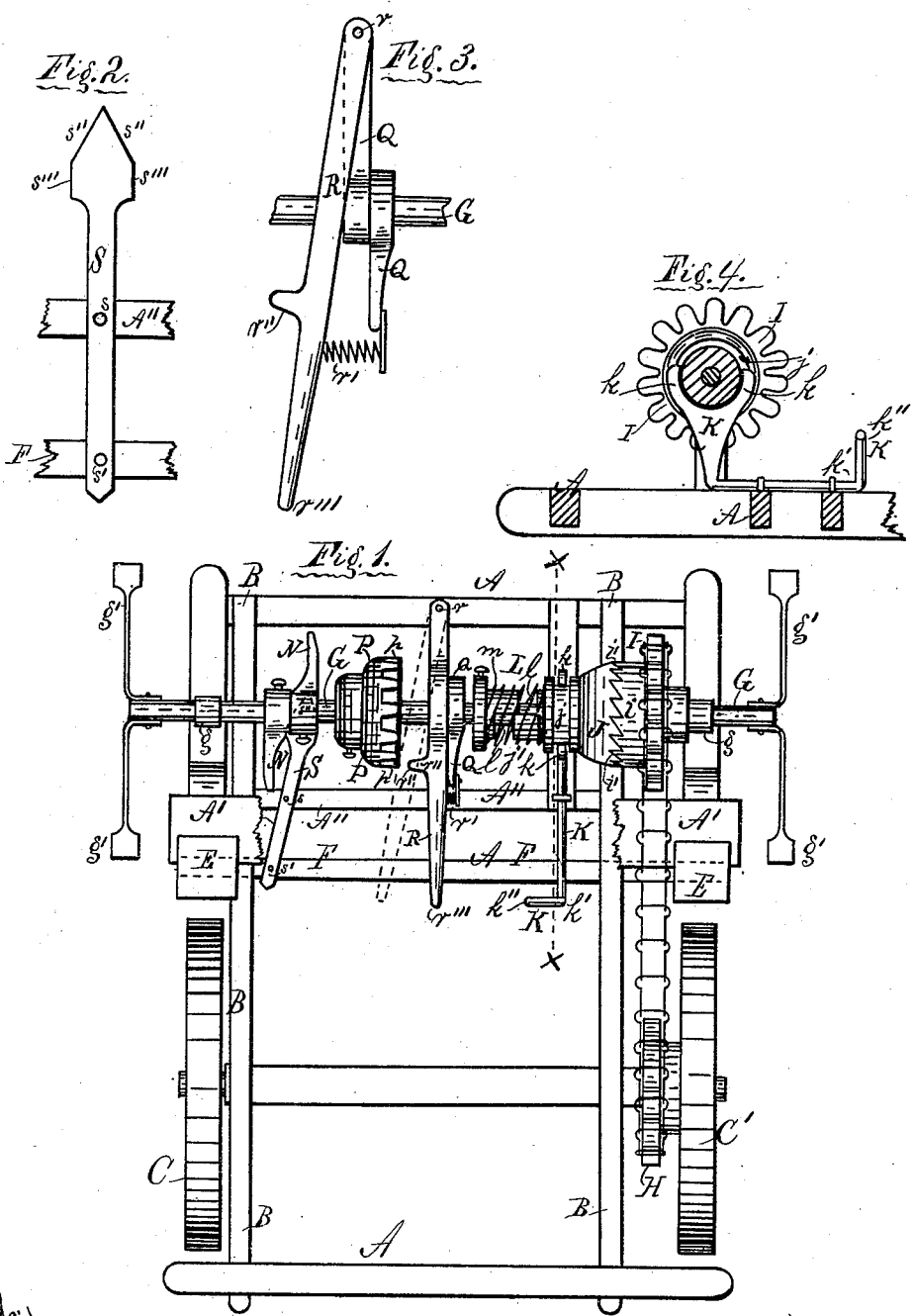
Witnesses.
S. R. Richards
Henry M. Clarke
Inventor.
Presson W. Thomson,
By W. B. Richards
Atty.

UNITED STATES PATENT OFFICE.

PRESSON W. THOMSON, OF YATES CITY, ILLINOIS, ASSIGNOR OF ONE-HALF TO LEROY A. THOMSON, OF SAME PLACE.

CHECK-ROW CORN-PLANTER

SPECIFICATION forming part of Letters Patent No. 264,794, dated September 19, 1882.

Application filed March 29, 1882. (No model.)

*To all whom it may concern:*

Be it known that I, PRESSON W. THOMSON, a citizen of the United States, residing at Yates City, in the county of Knox and State of Illinois, have invented certain new and useful Improvements in Check-Row Corn-Planters; and I do hereby declare the following to be a full, clear, and exact description of the invention, such as will enable others skilled in the art to which it appertains to make and use the same.

This invention relates to that class of check-row corn-planters in which the seed-slides or dropping-plates are operated by gear-connection with the wheels which support the main frame of the planter; and the invention consists in new constructions and new combinations of parts, as hereinafter described, and set forth in the claims hereto annexed.

In the accompanying drawings, which illustrate my invention and form a part of this specification, Figure 1 is a top plan of a planter embodying my invention. Fig. 2 is an enlarged plan of the oscillating lever for actuating the seed-slide connecting-bar. Fig. 3 is an enlarged plan of the lever for moving the markers' and wipers' shaft without moving the drive-wheel. Fig. 4 is a sectional elevation in the line $x\ x$ in Fig. 1, and elevation of adjacent parts.

Referring to the drawings by letters, the same letter indicating the same part in the different figures, letters A A' A'' represent the transverse and letters B the longitudinal framing-pieces of the frame of a corn-planter, supported on wheels C C' at one end and runners or furrow-openers D at its other end, and carrying seed-boxes E, with seed-slides, (not shown,) and a bar, F, which connects the seed-slides in the two seed-boxes, and is reciprocated endwise to operate said slides.

G is a shaft mounted in bearings $g$ on the planter-frame, and provided with two markers, $g'$, on each end. The central part of one of the transverse bars (marked A') is broken away to show parts beneath it. The parts hereinbefore described by letter are parts of an ordinary corn-planter, and may be constructed in any ordinary manner.

H is a chain-wheel fixed upon and to rotate with the wheel C', and is geared by a drive-chain belt with a chain-wheel, I, which is loosely mounted on the shaft G. The chain-wheel I has a hub or boss, $i$, on one side, in the end of which are ratchet-teeth $i'$, which gear with a sliding clutch, J, having corresponding ratchet-teeth.

K is a bent lever, the main central portion of which is journaled to the frame of the machine. One end of the lever K is bent upward, and has branches or arms $k$, which rest in a circumferential groove, $j$, in the clutch J, and the other end, $k'$, is bent upward and then to one side to form a handle, $k''$, so that by pressing down on the handle $k''$ the lever K may be rocked or turned to draw the clutch J to or from the clutch $i$, while the forks or arms $k$ do not interfere with the rotation of said clutch J.

L is a clutch fixed upon the shaft G, and has a projecting end, $l$, one-half of which is cut away, and rests always in gear with a similarly-formed projection, $j'$, from the clutch J, as shown at Fig. 1. A spring, $m$, encircles the parts $l$ and $j'$, and operates to press or force the clutch J into gear with the clutch $i$ and hold it in position, as shown at Fig. 1, so that the rotation of the chain-wheel I from the drive-wheel C' will rotate the clutches $i$ and J, and thereby rotate the shaft G with the forward movement of the planter.

N N are tappets or wipers, fixed to and projecting from opposite sides of the shaft G, in same or about the same radial planes as the markers $g'$.

P is a disk fixed on the shaft G, and has teeth $p$ in one face.

Q is an arm journaled at its midlength part to the shaft G, so that it may turn on but cannot slide lengthwise on said shaft.

R is a lever, one end of which is hinged or pivoted at $r$ to the forward end of the arm Q, and its other end, projecting rearward over the shaft G, is drawn toward the rear end of the arm Q by a spring, $r'$. The lever R has teeth $r''$ near its midlength, and can be drawn over by its end $r'''$, so that the teeth $r''$ will engage with the teeth in the disk P, as shown by dotted lines at Fig. 1 and full lines at Fig. 3.

S is a horizontal lever, pivoted at $s$ to the transverse framing-bar A″, so that it may oscillate in a horizontal plane and give motion to the seed-slide bar F, to which it is pivoted at s′. The lever S is formed at its forward end, as shown by full lines at Fig. 2 and dotted lines at Fig. 1, with cam-faces s″, and in rear of each face s″ a side face, s‴, parallel with the lever. The lever S is located below the shaft G, so that in rotating said shaft the tappets N will come alternately in sliding contact with the cam-faces s″, and thereby oscillate the lever S and operate the seed-slides in the ordinary manner. After each tappet N has given a full throw to the lever S, while in contact with a cam-face, s″, the tappet will pass rearward in contact with a side face, s‴, and thereby form a lock while in contact with said face, to prevent a throw or movement of the slide-bar F and seed-slides from accidental common causes.

The further operation of the device than hereinbefore described is as follows: The rotation of the shaft G from the drive-wheel C′ will operate the seed-slides, as already described, and the markers g′ will mark the ground to indicate where the seed was dropped in reference to rows transversely to the path of the planter. If it is found at any time that the seed is being dropped too soon, or not soon enough and out of line, the clutch J may be thrown out of gear with the clutch i by the driver placing his foot on the handle k″ of the lever K. Then, by swinging the lever R over to engage the disk P, said lever R may be used to rotate said disk and shaft G without turning the chain-wheel I, and thereby turn the markers and tappets forward or backward to bring them into proper relation to the transverse rows of planting. When it is desired to move the planter without dropping the clutch J may be thrown out of gear with clutch i, as already described, and allow the chain-wheel I to turn on without rotating the shaft G. In backing the machine the clutches J and i may be thrown out of gear, as already described, or the lever R may be engaged with the disk P and its rear end allowed to come down upon the transverse framing-bar A′ to hold the shaft G from rotation, while the rotation backward of the clutch i will, by its inclined ratchet-teeth, force the clutch J away from and out of gear with it, and thus permit the clutch i to rotate backward without rotating the shaft G.

I am aware of the Patents No. 177,931, granted to J. B. Gale; No. 188,024, to H. McQuiniff; No. 210,753, of C. E. Cole, and No. 222,104, of J. H. Warfield, and disclaim the construction therein shown; but

What I claim as new is—

1. The shaft G, having markers g′, disk P, and tappets N fixed thereon, and chain-wheel I and ratchet-teeth clutches i and J and swinging lever R loosely seated thereon, in combination with the drive-wheel C′, having chain-wheel fixed thereto and geared with the chain-wheel I by a chain-belt, whereby the machine may be backed without rotating the shaft G, substantially as and for the purpose specified.

2. In combination with the drive-wheel C′, having chain-wheel fixed thereon and geared with a loose chain and clutch-wheel, I, on the shaft G, the sliding clutch J and its operating-lever K and fixed clutch L and spring m, both of said clutches being on the shaft G and adapted to operate substantialy as and for the purpose specified.

3. In combination with the drive-wheel C′, having chain-wheel fixed thereon and geared with a loose chain and clutch-wheel, I, on the shaft G, sliding clutch J and its operating-lever K and fixed clutch L and spring m, and tappets N, the fixed disk P, and swinging lever R, adapted to engage therewith to rotate the shaft G while the clutches i and J are held out of gear by the lever K, substantially as and for the purpose specified.

4. In combination with the rotating shaft G, having tappets N thereon, and with the seed-slide bar F, the oscillating pivoted lever S, having, in connection with ordinary cam-faces, s″, the faces s‴, adapted to coact with the tappets N to lock or hold the seed-slides, substantially as and for the purpose specified.

In testimony whereof I affix my signature in presence of two witnesses.

PRESSON W. THOMSON.

Witnesses:
  MORTON W. THOMSON,
  CHARLES L. ROBERTS.